United States Patent
Winter

(10) Patent No.: US 11,897,526 B2
(45) Date of Patent: Feb. 13, 2024

(54) COMMUNICATION SYSTEM

(71) Applicant: Conductix-Wampfler GmbH, Weil am Rhein (DE)

(72) Inventor: Nicholas Winter, Lörrach (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 373 days.

(21) Appl. No.: 17/429,677

(22) PCT Filed: Jul. 25, 2019

(86) PCT No.: PCT/EP2019/070007
§ 371 (c)(1),
(2) Date: Aug. 10, 2021

(87) PCT Pub. No.: WO2021/004643
PCT Pub. Date: Jan. 14, 2021

(65) Prior Publication Data
US 2022/0105971 A1 Apr. 7, 2022

(30) Foreign Application Priority Data

Jul. 9, 2019 (DE) ...................... 10 2019 118 531.9

(51) Int. Cl.
*H04W 4/44* (2018.01)
*B61L 27/70* (2022.01)
(Continued)

(52) U.S. Cl.
CPC ............... *B61L 27/70* (2022.01); *B61L 25/02* (2013.01); *H01Q 1/3225* (2013.01);
(Continued)

(58) Field of Classification Search
CPC ....... B61L 27/70; B61L 25/02; H04B 17/327; H04W 4/44; H01Q 1/3225; H01Q 13/22
See application file for complete search history.

(56) References Cited

U.S. PATENT DOCUMENTS 3,278,850 A 10/1966 Tomizawa
5,057,797 A 10/1991 Heddebaut
(Continued)

FOREIGN PATENT DOCUMENTS

CN 101373860 A 2/2009
CN 102893451 A 1/2013
(Continued)

OTHER PUBLICATIONS

Chinese First Office Action dated Sep. 28, 2023 for Chinese Application No. 201980089507.X.
(Continued)

*Primary Examiner* — Mathew Franklin Gordon
(74) *Attorney, Agent, or Firm* — Paul D. Bianco; Fleit Intellectual Property Law

(57) ABSTRACT

In a communications system for communication between a vehicle guided along a predefined movement path and a stationary station using a slotted waveguide which extends parallel to the movement path of the vehicle and into which at least one antenna connected to a transceiver unit of the stationary station and at least one antenna of the vehicle project, wherein the antenna of the vehicle is moved in the longitudinal direction of the slotted waveguide with a movement of the vehicle, a switching device is arranged between the antenna of the vehicle and a transceiver unit of the vehicle, by means of which the antenna can be selectively connected to the transceiver unit of the vehicle either directly or via at least one interconnected attenuation element. The switching device can be actuated by the control device of the vehicle according to the power of a received signal.

13 Claims, 3 Drawing Sheets

(51) Int. Cl.
- *H04B 17/327* (2015.01)
- *B61L 25/02* (2006.01)
- *H01Q 1/32* (2006.01)
- *H01Q 13/22* (2006.01)

(52) U.S. Cl.
CPC .......... *H01Q 13/22* (2013.01); *H04B 17/327* (2015.01); *H04W 4/44* (2018.02)

(56) References Cited

U.S. PATENT DOCUMENTS

| | | |
|---|---|---|
| 6,091,372 A | 7/2000 | Dienes |
| 6,108,313 A | 8/2000 | Lee |
| 9,136,571 B2 | 9/2015 | Papziner |
| 9,824,805 B2 | 11/2017 | Wechlin |
| 2020/0044360 A1 | 2/2020 | Kamo |
| 2020/0223658 A1 | 7/2020 | Bauer |
| 2022/0209384 A1 | 6/2022 | Winter |
| 2022/0209388 A1 | 6/2022 | Winter |

FOREIGN PATENT DOCUMENTS

| | | |
|---|---|---|
| CN | 104245402 A | 12/2014 |
| CN | 105281042 A | 1/2016 |
| CN | 107104697 A | 8/2017 |
| DE | 10 2012 006412 A1 | 10/2012 |
| DE | 102012002183 A1 | 8/2013 |
| DE | 10 2013 002 227 B4 | 11/2014 |
| EP | 1998403 A1 | 12/2008 |
| JP | 08046545 A | 2/1996 |
| JP | H10215202 A | 8/1998 |
| JP | 11284542 A | 10/1999 |
| JP | 2005051623 A | 2/2005 |
| WO | 2018/095803 A1 | 5/2018 |
| WO | 2021/004645 A1 | 1/2021 |
| WO | 2021/004646 A1 | 1/2021 |

OTHER PUBLICATIONS

Japanese Office Action dated Sep. 20, 2022 for Application No. 2021-529717 with translation (11 pages).
W. D. Schuck and R. Rieger, The Slotted-Waveguide Communication System of the Maglev Test Range in the Emsland, 1983, 13th European Microwave Conference, IEEE, 1983, pp. 681-686.
Office Action dated Oct. 2, 2023, for U.S. Appl. No. 17/429,686.
Office Action dated Sep. 8, 2023, for U.S. Appl. No. 17/429,697.
International Search Report and Written Opinion for PCT/EP2019/075999 filed Sep. 26, 2021.
International Preliminary Report on Patentability, dated Jan. 11, 2022, for PCT/EP2019/070007 (English translation).
International Preliminary Report on Patentability, dated Jan. 11, 2022, for PCT/EP2019/076000 (English translation).
International Preliminary Report on Patentability, dated Jan. 11, 2022, for PCT/EP2019/075999 (English translation).
International Search Report and Written Opinion for PCT/EP2019/076000, dated Sep. 26, 2019.
Schuck, The slotted-waveguide communication system of the maglev test range, Proceedings of the 13th European Microwave Conference, Sep. 8, 1983, p. 681-686.
Vahle, SMG-Slotted Microwave Guide Table of Contents, May 17, 2006.
Written Opinion dated Mar. 30, 2020, for PCT/EP2019/070007 (English translation).
Written Opinion dated Apr. 9, 2020, for PCT/EP2019/076000 (English translation).
Written Opinion dated Apr. 9, 2020, for PCT/EP2019/075999 (English translation).
Vahle, SMG-Slotted Microwave Guide, May 17, 2006 (36 pages).
International Search Report (dated Mar. 18, 2020) and Written Opinion for PCT/EP2019/070007, filed Jul. 25, 2019.
Schweber, RF Attenuators: For When You Have Too Much of a Good Thing, Sep. 10, 2015, retrieved from www.digikey.nl/en/articles/techzone/2015/sep/rf-attenuators-for-when-you-have-too-much-of-a-good-thing.
Notification of Reasons for Refusal dated Nov. 7, 2023 for Japanese Application No. 2021-529716.

COMMUNICATION SYSTEM

FIELD OF THE INVENTION

The invention concerns a communication system.

BACKGROUND OF THE INVENTION

Such a communication system is known, for example, from DE 10 2013 002 227 B4. It permits communication with high bandwidth and noise immunity between a vehicle guided along a predetermined movement path and a fixed station. An antenna is arranged on a vehicle so that it projects through a slot into the cavity of a waveguide and can receive and/or transmit electromagnetic waves propagating along the waveguide while the vehicle is moving. A corresponding antenna of a fixed station is arranged at one end of the waveguide.

The power of a received signal in a communication system of this type, as in any communication system based upon the propagation of electromagnetic waves, depends on the distance between the transmitting and the receiving antennas. The transmission power and length of the travel path must be adapted to each other so that, on the one hand, a signal-to-noise ratio sufficient for noise-immune message transmission is guaranteed between the transmitter and receiver at maximum possible distance and, on the other hand, the overloading of the receiver because of unduly high power of the received signal is absent at minimal possible distance between the transmitter and receiver, which can cause interference in message transmission or even damage to the receiver. The maximum transmission power and consequently the maximum length of the transmission path because of the first named condition is limited by the last named condition.

The transmitting and receiving devices in the document just mentioned both for the fixed station and the vehicle are connected to their corresponding antennas via an attenuator. A signal on the path from the transmitter to the receiver therefore always passes through two attenuators, namely, one between the transmitter and transmitting antenna, and one between the receiving antenna and receiver. Due to the design of these attenuators, at a given output power of a transmitter and input sensitivity of a receiver, a level adjustment for largely noise-free operation can be effected. The limitation of maximum length of the transmission path just explained, however, also applies to this concept.

SUMMARY OF THE INVENTION

Given the aforementioned prior art, one aspect of the invention is to increase the maximum length of the transmission path.

Accordingly, a communication system is disclosed herein. Advantageous embodiments are also disclosed.

According to the invention, in a communication system for communication between a vehicle guided along a predetermined movement path and a fixed station using a slotted waveguide that extends parallel to the movement path of the vehicle and into which project at least one antenna connected to a transmitting and receiving device of the vehicle and at least one antenna connected to a transmitting and receiving device of the fixed station, wherein the antenna of the vehicle is moved in the longitudinal direction of the slot during movement of the vehicle, an attenuation unit with adjustable attenuation is connected between the antenna of the vehicle and a transmitting and receiving device of the vehicle. The communication range can thereby be increased by increasing the transmitting power of the transmitter and preventing the receiver from being overloaded by means of the attenuation unit if the signal power received by the antennas on approach of the vehicle to the fixed station would increase excessively due to the increased transmission power.

The attenuation unit expediently has an analog or digital interface, through which its attenuation is adjustable by means of a control signal applied to the interface. Adjustment of attenuation in this case can be conducted on the vehicle side, and therefore in a decentralized manner, and does not require transmission of additional control signals via the slotted waveguide.

It is particularly advantageous that the attenuation unit is connected to an attenuation control, to which the signal indicating the power of the received signal is supplied from the transmitting and receiving device, and the attenuation control adjusts the attenuation of the attenuation unit as a function of the power of the received signal. This power is the immediate criterion that makes the variation of attenuation necessary, because below a certain distance between the transmitter and receiver it would be too large for the receiver.

The attenuation unit can also be connected to an attenuation control, to which a signal indicating the position of the vehicle is supplied from a control device of the vehicle, and the attenuation control can adjust the attenuation of the attenuation unit as a function of the position of the vehicle. The position of the vehicle and therefore the length of the transmission path can either be used as an alternative to the power of the received signal as criterion for adjusting the attenuation, since the signal power diminishes with increasing length of the transmission path in a defined manner, or both criteria can be combined, for example, in the context of a plausibility test.

An expedient implementation of an attenuation unit exists in an attenuator with continuously variable attenuation, whose value is adjustable by an analog signal that is derived by an interface of the attenuation unit from the control signal supplied to it. The advantage of this implementation is that by continuous variation of attenuation its value can always be optimally set.

A simpler implementation of an attenuation unit consists of the fact that a switching device is provided, by means of which the antenna of the vehicle can be selectively connected directly to the transmission and receiving device of the vehicle or via at least one attenuation unit connected in between. This permits a stepwise change in attenuation with which sufficient accuracy of the attenuation setting is also attainable in a corresponding number of stages. The switching device can expediently be activated via an interface of the attenuation unit through an attenuation control of the vehicle.

One possibility for stepwise variation of attenuation consists of the fact that at least two attenuators of different attenuation are provided, and that the antenna can be selectively connected by the switching device of the vehicle either directly or via one of the attenuators to the transmitting and receiving device of the vehicle. Another possibility for stepwise variation of attenuation consists of the fact that at least two attenuators are provided, and that the antenna can be selectively connected by the switching device either directly or via one of the attenuators or via a series circuit of several attenuators to the transmitting or receiving device of the vehicle.

Two antennas can also be arranged one behind the other at a predetermined spacing in the direction of travel on the vehicle. The transmitting and receiving device of the vehicle in this case has two connections for antennas and between each antenna of the vehicle and the transmission and receiving device of the vehicle an attenuation unit with adjustable attenuation is connected. Such an arrangement is advantageous in a communication system that is supposed to furnish a transmission path of great length for a transport system of great length. In this case the slotted waveguide consists of several sections, between each of which a gap is provided that would lead to interruption in communication during use of only a single antenna, when the antenna is moved in its area. By using two antennas one behind the other, each equipped with a switchable attenuator, interruption of communication at such a gap can be avoided.

Advantageously, the attenuation units in this case are connected to an attenuation control with several outputs, through which their attenuations are adjustable independently of each other. For this purpose, a signal indicating the power of the received signal is supplied to the attenuation control from the transmitting and receiving device of the vehicle and the attenuation control adjusts the attenuations of the attenuation units as a function of the power of the received signals, or a signal indicating the position of the vehicle is supplied to the attenuation control from a control device of the vehicle and the attenuation control adjusts the attenuations of the attenuation units as a function of position of the vehicle. A combination of both criteria is also possible here, for example, for the purpose of a plausibility test.

BRIEF DESCRIPTION OF THE DRAWINGS

Embodiment examples are described below with reference to the drawings. In the drawings

DETAILED DESCRIPTION OF THE INVENTION

Figure 1:
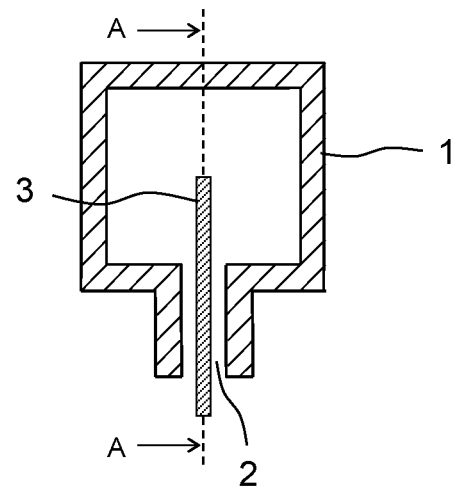
FIG. 1 shows a schematic cross-sectional view of a slotted waveguide with an antenna projecting into it.

FIG. 1 shows a schematic cross-sectional view of a slotted waveguide 1, as used in the prior art in a communication system for communication between a vehicle 4 guided along a predetermined movement path and a fixed station 5 and/or between several such vehicles. An antenna 3 of a vehicle projects through the slot 2 into the slotted waveguide 1 in order to emit and receive electromagnetic waves that are propagating along the slotted waveguide 1. When the vehicle moves along a predetermined movement path, the antenna 3 then moves together with it in the longitudinal direction of the slotted waveguide 1. The vehicle 4 can be guided especially by rails along a prescribed travel path.

Figure 2:
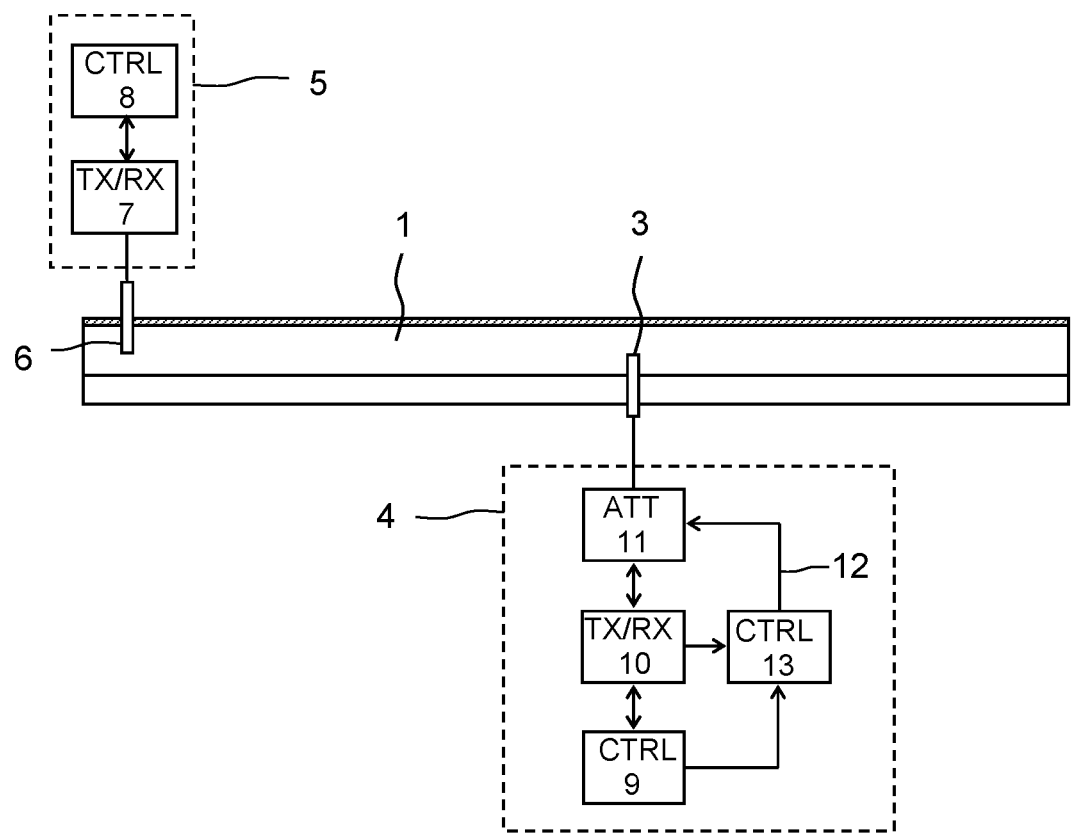
FIG. 2 shows a schematic longitudinal section of a slotted waveguide in the direction of arrow A-A in FIG. 1 with a block diagram of the additional components of the communication system according to the invention.

As shown in FIG. 2, an antenna 6 of the fixed station 5 also projects into the slotted waveguide 1. It is connected to a transmitting and receiving device 7, hereinafter referred to as transceiver 7. The antenna 6 of the fixed station 5, like antenna 3 of vehicle 4, could also project through the slot 2 into the slotted waveguide 1, but need not do so, since it need not be movable. The transceiver 7 is connected to a control device 8 of the fixed station 5, which controls the entire transport system, which can also include several vehicles 4, and/or monitors its operation, for example, by means of video signals and status reports. The control device 8 can exert a controlling function, but need not do so and can also serve exclusively for the purpose of monitoring the operation. For this purpose, continuous bidirectional data communication occurs between the control device 8 of fixed station 5 and a control device 9 of vehicle 4, which controls movement of vehicle 4, through the slotted waveguide 1 as a transmission channel.

As also shown in FIG. 2, the control device 9 of vehicle 4 is connected for this purpose to a transmitting and receiving device 10, hereinafter referred to as transceiver 10, on board the vehicle 4. This transceiver 10 is connected to the antenna 3 of vehicle 4 via an attenuation unit 11. The attenuation unit 11 is reciprocal, i.e., it attenuates a signal in the same way in both possible passage directions: from the transceiver 10 to the antenna 3 of vehicle 4, and vice versa from antenna 3 to transceiver 10. The attenuation of attenuation unit 11 is adjustable via a control line 12. An attenuation control 13 is connected to this, which is connected to the transceiver 10 and to the control device 9. The maximum attenuation of the attenuation unit 11 is laid out so that at minimal possible distance of the vehicle 4 from the fixed station 5, when the attenuation unit 11 is set at its maximum attenuation, neither the input of the transceiver 10 of vehicle 4 is overloaded when the transceiver 7 transmits to the fixed station 5, nor is the input of the transceiver 7 of the fixed station 5 overloaded when the transceiver 10 of the vehicle 4 transmits.

When the vehicle 4 moves away from the fixed station 5, the level of the signals receivable by antennas 3 and 6 diminishes at constant transmission power of transceivers 7 and 10, and at a certain distance reaches a value at which the signal-to-noise ratio at the receiving input of at least one of the two transceivers 7 and 10 becomes too low for noise-free message transmission. Even before this occurs, the attenuation control 13 of vehicle 4 adjusts the attenuation of the attenuation unit 11 in a timely manner to a lower value so that the signal power receivable by each of the two receivers 7 and 10 is increased to such an extent that the resulting increase in signal-to-noise ratio at the corresponding receiving input of both transceivers 7 and 10 permits largely noise-free message transmission.

The maximum distance over which the vehicle 4 can communicate with fixed station 5 is significantly expanded by the capability according to the invention of varying the attenuation between antenna 3 and transceiver 11 of vehicle 4 as a function of distance by the selective adjustment of the attenuation of the attenuation unit 11, in comparison with a configuration without attenuation unit 11 or a configuration with an attenuator with fixed attenuation value connected in the signal path between antenna 3 and transceiver 10.

The adjustment as a function of distance of attenuation of attenuation unit 11 preferably occurs by means of measurement of the signal level on the receiving input of transceiver 10, since the signal level represents the direct criterion for the need to change attenuation. This signal level is continuously reported to attenuation control 13 by the transceiver 10. With this information, the attenuation control 13 adjusts the attenuation of attenuation unit 11 by means of control line 12 to the corresponding optimal value.

However, the distance between vehicle 4 and the fixed station 5 can also be used as a criterion for changing the attenuation of attenuation unit 11. Thus, in a transport system of the type in which a communication system according to the invention is conceived as a component, the arrangement of optical markings along the travel path is common, by means of which the control device 9 of vehicle 4 can determine its position along the travel path and thus also the distance from the antenna 3 on the vehicle side to the antenna 6 of the fixed station 5 by means of optical sensors.

This information can be used either as an alternative or in addition to the current level of the signal arriving at the antenna input of transceiver 10 by the attenuation control 13 to make a decision regarding a change in attenuation of the attenuation unit 11. For this purpose, the attenuation control 13 is connected to the control device 9 of vehicle 4. In principle, only one of the two pieces of information (received signal level or vehicle position) would also be sufficient as criterion for adjusting the attenuation.

The transmitting power of transceivers 7 and 10 is always selected according to the maximum required range of the communication system. If the vehicle 4 is at maximum distance from fixed station 5, the attenuation of attenuation unit 11 is set at its minimal possible value. When vehicle 4 moves from such a position in the direction of fixed station 5, which results in a corresponding rise in power of the signals received by transceivers 7 and 10, the attenuation of attenuation unit 11 is further increased by the attenuation control 13 via control line 12, so that the signal power at the receiving inputs of transceivers 7 and 10 is always kept in the admissible range until the minimal possible distance between vehicle 4 and fixed station 5 is reached.

Figure 3:
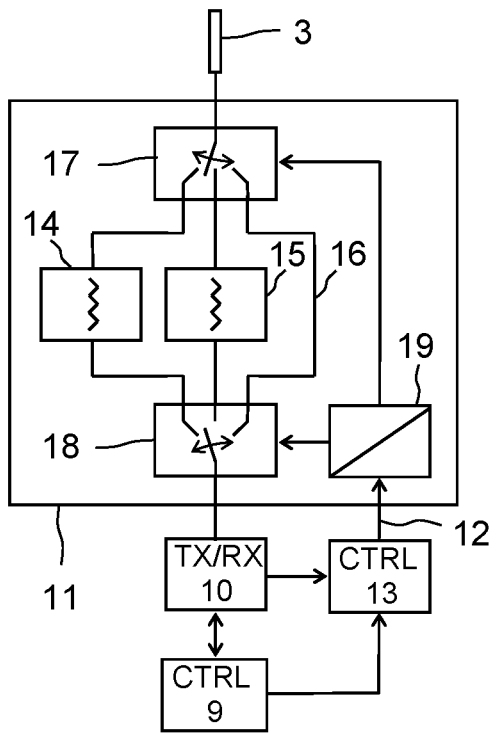
FIG. 3 shows a block diagram of a first embodiment of the components of the communication system according to the invention on the vehicle side of FIG. 2.

A first embodiment of the part of the communication device according to the invention on the vehicle side with an adjustable attenuation unit 11 is shown in FIG. 3. This attenuation unit 11 consists of two attenuators 14 and 15 with fixed attenuation of different size, a short line 16 with very limited attenuation, two switches 17 and 18, and an interface 19. One connection each, at antenna 3 in the case of switch 17 and at transceiver 10 in the case of switch 18, is selectively connected by means of switches 17 and 18 to one of three other connections. At each of these two switches 17 and 18, the first attenuator 14 is connected to the first of these three other connections, the second attenuator 15 is connected to the second of these three other connections and the short line 16 is connected to the third of these three other connections.

The control line 12 leading from the attenuation control 13 to the attenuation unit 11 is connected to interface 19, which derives internal control signals to control switches 17 and 18 from a digital control signal supplied via control line 12, with which it is connected via corresponding control lines. By selecting the switch position of switches 17 and 18 by means of the control signal supplied via control line 12, the attenuation control 13 of vehicle 4 can selectively connect antenna 3 to transceiver 10 via one of the two attenuators 14 or 15 or directly via line 16. Because of the different attenuations of attenuators 14 and 15, there is a capability of varying the attenuation between two different values when one of the attenuators 14 or 15 is connected in the signal path between antenna 3 and transceiver 10. It is understood that switches with more than three connections can also be used on one side and more than two attenuators with different attenuation values in order to implement even finer gradation of attenuation as a function of the distance between vehicle 4 and fixed station 5.

Figure 4:
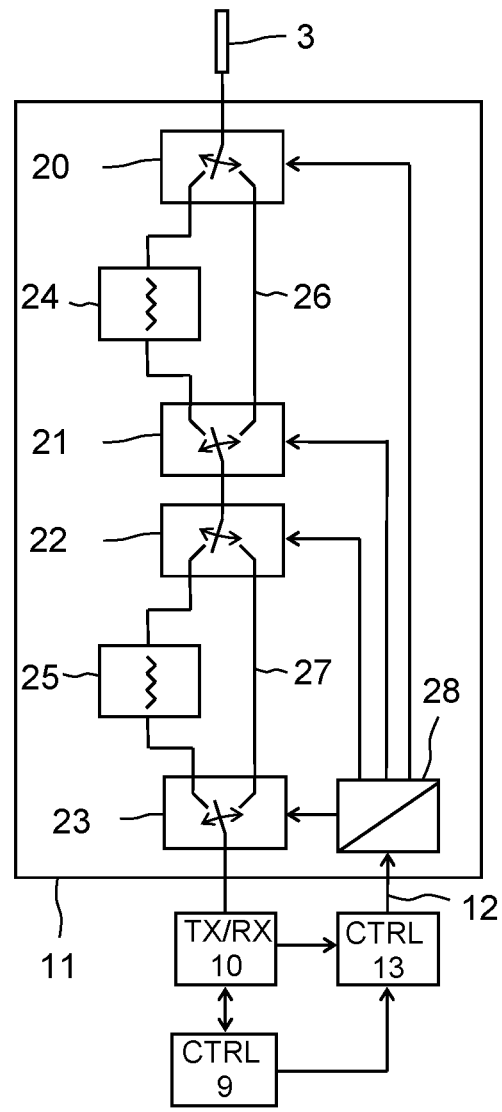
FIG. 4 shows a block diagram of a second embodiment of the components of the communication system according to the invention on the vehicle side of FIG. 2.

A second embodiment of the part on the vehicle side of a communication device according to the invention with adjustable attenuation unit 11 is shown in FIG. 4. In this embodiment two attenuators 24 and 25 can be selectively connected by four switches 20, 21, 22 and 23 with fixed attenuation individually or in series between antenna 3 and transceiver 10 of vehicle 4. A first attenuator 24 and a first short line 26 are connected to antenna 3 via a first switch 20 precisely as in the first embodiment of FIG. 2. A second attenuator 25 and a second short line 27 of the same type are connected to transceiver 10 via a second switch 23 precisely as in the first embodiment of FIG. 2. Two switches 21 and 22 are connected in series between attenuators 24 and 25 and lines 26 and 27, by means of which the first attenuator 24 can be connected in series with either the second attenuator 25 or the second line 27, or the first line 26 can be connected in series with either the second attenuator 25 or the second line 27.

By selecting the positions of the four switches 20, 21, 22 and 23, the antenna 3 can therefore be directly connected to transceiver 10, i.e., via the two lines 26 and 27 or via the first line 26 and the second attenuator 25 or via the first attenuator 24 and the second line 27 or via the series circuit of both attenuators 24 and 25. If the attenuators 24 and 25 have different attenuation values, the attenuation can thus be varied in three steps, when one or both of the attenuators 24 and 25 is or are connected in the signal path between antenna 3 and transceiver 10. It is understood that more than two combinations of an attenuator and a line can also be connected via switches in series in order to implement even finer gradation of attenuation as a function of the distance between vehicle 4 and a fixed station 5.

The switches 20 to 23 are again controlled via control lines from an interface 28, to the input of which the control line 12 is connected, via which the attenuation unit 11 is connected to the attenuation control 13 of vehicle 4.

Figure 5:
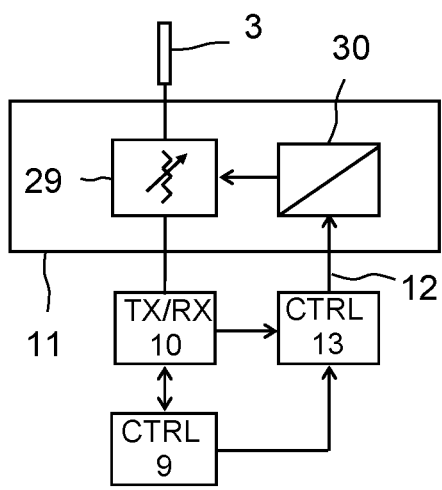
FIG. 5 shows a block diagram of a third embodiment of the components of the communication system according to the invention on the vehicle side of FIG. 2.

A third embodiment of the part on the vehicle side of a communication device according to the invention with an adjustable attenuation unit 11 is shown in FIG. 5. In this embodiment an attenuator 29 is provided with continuously variable attenuation. This attenuator 29 contains an electrically adjustable ohmic resistance in the form of a diode, the value of which is variable by application of a DC voltage. The DC voltage can be separated from the high-frequency message signal to be attenuated in a simple manner by filtering. The interface 30 of the attenuation unit 11 generates the DC voltage to adjust the attenuation of the variable attenuator 29 from the signal applied to it by the attenuation control 13 via control line 12.

It is also possible to combine the aforementioned embodiments of a variable attenuation unit 11 with each other. Attenuators can be connected in series and in parallel with one another, and attenuators with continuously variable attenuation can be used within a series and/or parallel connection that is variable by switches in order to realize both a large variation in attenuation and a precise adjustment of the desired attenuation value.

The control line 12 in all embodiments can be a simple two-wire line to which the attenuation control 13 applies an analog signal in the form of a variable voltage, the magnitude of which is proportional to the value of the attenuation to be set. However, a multi-wire control line 12 can also be used, via which a digital signal is transmitted, in which the value of the attenuation to be set is coded. In this case, the interfaces 19 and 28 have the function of a decoder and the interface 30 has the function of a digital-to-analog converter. It would also be possible in an embodiment with switchable attenuators to use an analog voltage to adjust the attenuation, which is converted by the interfaces 19 and 20 by means of threshold value comparisons to control signals for switches. A further alternative for implementation of control line 12 is a data line for serial data transmission. In this case the interfaces 19, 28 and 30 can contain a USB, Ethernet or RS485 interface and the attenuation control 13 is then also equipped with such an interface.

The switches depicted in FIGS. 3 and 4 are preferably not mechanical but electronic switches in the form of semiconductor elements, particularly transistors. The different components of the attenuation unit 11 can be arranged on a common substrate and connected to each other by conductive traces. This common substrate can also be a silicon chip on which all components are integrated by means of semiconductor technology.

Figure 6:
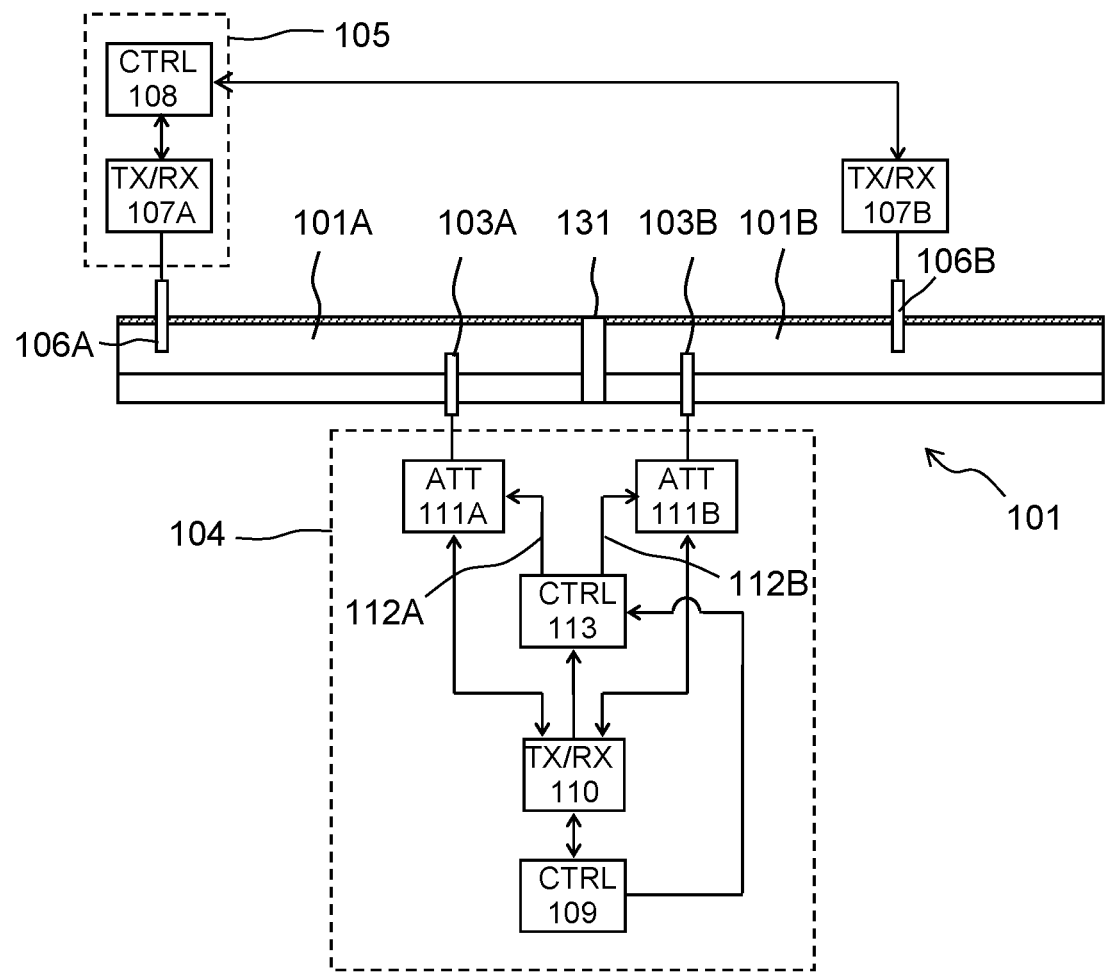
FIG. 6 shows a view corresponding to FIG. 2 of a second embodiment of the communication system according to the invention.

A second embodiment of a communication system according to the invention is shown in FIG. 6. In contrast to the embodiment of FIG. 2, two attenuation units 111A and 111B are provided on vehicle 104 with attenuation independently adjustable from each other and two antennas 103A and 03B. The attenuation units 111A and 111B are of the same type as the attenuation unit 11 of the first embodiment, which was described above with reference to FIGS. 3 to 5. They are regularly adjusted to the same attenuation. The transceiver 110 of vehicle 104 has two different antenna connections, to which one antenna each 103A or 103B is connected via an attenuation unit 111A or 111B connected in between. Accordingly, two control lines 112A and 112B go from the attenuation control 113 of vehicle 104, namely one each to the adjustable attenuation units 111A and 111B. As in the first embodiment, the transceiver 110 and the attenuation control 113 here are also connected to the control device 109 of vehicle 104.

The second embodiment is provided for transport systems of a greater length, which requires that the slotted waveguide 101 consist of at least two different sections 101A and 101B separated by a gap 131, the two separate fixed transceivers 107A and 107B in the example depicted in FIG. 5 each being connected to its own antenna 106A and 106B, each being assigned to one of the different sections 101A or 101B of the slotted waveguide 101 and connected to a common control device 108 of fixed station 105.

However, a gap 131 can also be necessary if a sufficient range of communication is guaranteed with only a single fixed transceiver 107A and a single antenna 106A, but, due to the length of sections 101A and 101B, a tolerance is necessary for a thermal change in length of these sections. In this case, antennas that are connected by a flexible conductor piece are arranged on the facing ends of the different sections 101A or 101B of the slotted waveguide 101 at gap 130. Signal transmission between the different sections 101A or 101B of the slotted waveguide 101 occurs through this arrangement of passive elements. The additional transceiver 107B as well as the additional antenna 106B drop out in this configuration.

The two antennas 103A and 103B of vehicle 104 are offset relative to each other in its travel direction so that an antenna 103A always projects into one section 101A and the other antenna 103B into the other section 101B of the slotted waveguide 101 at a gap 131 between two sections 101A and 101B of the slotted waveguide 101. Interruption of communication is thereby avoided if the vehicle 104 travels over a gap 131 between two different sections 101A and 101B of slotted waveguide 101. The attenuation units 111A and 111B provided in the two signal paths between each of the antennas 103A and 103B of vehicle 104 and the corresponding connection of transceiver 110 are identical. The signal paths are adjustable to different attenuation values independently and as required. The latter might be of interest if a gap 131 between two different sections 101A and 101B is to be separated with different distance from the two fixed antennas 106A and 106B.

Since the position of each gap 131 is known, the control device 109 of vehicle 104 can produce, as required, in timely fashion a control signal to attenuation control 113 during travel on approach to gap 131, which can be established, for example, by scanning markings arranged along the travel path by means of optical sensors, the attenuation control adjusting the attenuation of the second signal path to an appropriate value on receiving said control signal. Communication can then be switched to the second signal path at the correct time. It is understood that the second embodiment of the invention is not restricted to use in a slotted waveguide 101 consisting of two sections 101A and 101B, but is usable in slotted waveguides consisting of an arbitrary number of sections.

The invention claimed is:

1. A communication system for communication between a vehicle guided along a predetermined movement path and a fixed station using a slotted waveguide that extends parallel to the movement path of the vehicle and into which project at least one antenna connected to a transmitting and receiving device of the fixed station and at least one antenna of the vehicle, wherein the at least one antenna of the vehicle is moved in the longitudinal direction of the slotted waveguide during movement of the vehicle, wherein an attenuation unit with adjustable attenuation is connected between the at least one antenna of the vehicle and a transmitting and receiving device of the vehicle.

2. The communication system according to claim 1, wherein the attenuation unit has an analog or digital interface via which attenuation is adjustable by means of a control signal supplied to the attenuation unit at the interface.

3. The communication system according to claim 1, wherein the attenuation unit is connected to an attenuation control, to which a signal, indicating the power of the received signal is supplied from the transmitting and receiving device of the vehicle, and wherein the attenuation control adjusts the attenuation of the attenuation unit as a function of the power of the received signal.

4. The communication system according to claim 1, wherein the attenuation unit is connected to an attenuation control, to which a signal indicating the position of vehicle is supplied from a control device of the vehicle, and wherein the attenuation control adjusts the attenuation of the attenuation unit as a function of the position of the vehicle.

5. The communication system according to claim 1, wherein the attenuation unit has an attenuation element with continuously variable attenuation, whose value is adjustable by an analog signal that is derived by an interface of the attenuation unit from the control signal supplied to the attenuation unit.

6. The communication system according to claim 1, wherein a switching device is provided in the attenuation unit, by means of which the antenna of the vehicle can be selectively connected directly or via at least one attenuation element connected in between to the transmitting and receiving device of the vehicle.

7. The communication system according to claim 6, wherein the switching device can be activated via an interface of the attenuation unit by an attenuation control of the vehicle.

8. The communication system according to claim 6, wherein at least two attenuation elements of different attenuation are provided, and wherein the antenna can be selectively connected by the switching device of the vehicle directly or via one of the attenuation elements to the transmitting and receiving device of the vehicle.

9. The communication system according to claim 6, wherein at least two attenuation elements are provided, and wherein the antenna can be selectively connected via the switching device directly or via one of the attenuation elements or via a series circuit of several attenuation elements to the transmitting and receiving device of the vehicle.

10. The communication system according to claim 1, wherein two antennas are arranged one behind the other in the direction of travel at a predetermined spacing on the vehicle, wherein the transmitting and receiving device of vehicle (104) has two connections for the antennas, and wherein an attenuation unit with adjustable attenuation is connected between each antenna of the vehicle and the transmitting and receiving device of the vehicle.

11. The communication system according to claim 10, wherein the attenuation units are connected to an attenuation control with several outputs, through which the attenuations are adjustable independently of each other.

12. The communication system according to claim 11, wherein a signal indicating the power of the received signals is supplied to the attenuation control from the transmitting and receiving device of the vehicle, and wherein the attenuation control adjusts the attenuations of the attenuation units as a function of the power of the received signals.

13. The communication system according to claim 11, wherein a signal indicating the position of vehicle is supplied to the attenuation control by the control device of the vehicle, and wherein the attenuation control adjusts the attenuations of the attenuation units as a function of the position of the vehicle.

* * * * *